United States Patent [19]
Brennan, III et al.

[11] Patent Number: 6,035,083
[45] Date of Patent: Mar. 7, 2000

[54] METHOD FOR WRITING ARBITRARY INDEX PERTURBATIONS IN A WAVE-GUIDING STRUCTURE

[75] Inventors: James F. Brennan, III; Dwayne L. LaBrake, both of Austin, Tex.

[73] Assignee: 3M Innovative Company, St. Paul, Minn.

[21] Appl. No.: 09/110,495

[22] Filed: Jul. 6, 1998

Related U.S. Application Data

[63] Continuation-in-part of application No. 08/942,590, Oct. 2, 1997.

[51] Int. Cl.[7] .................................................. G02B 6/34
[52] U.S. Cl. ............................. 385/37; 385/123; 359/569
[58] Field of Search ................................. 385/10, 31, 33, 385/37, 123; 359/558, 566, 569, 573; 372/26, 28

[56] References Cited

U.S. PATENT DOCUMENTS

| | | | |
|---|---|---|---|
| 5,066,133 | 11/1991 | Brienza | 359/570 |
| 5,104,209 | 4/1992 | Hill et al. | 385/27 |
| 5,216,739 | 6/1993 | Hill et al. | 385/123 |
| 5,327,515 | 7/1994 | Anderson et al. | 385/123 |
| 5,619,603 | 4/1997 | Epworth et al. | 385/37 |
| 5,636,304 | 6/1997 | Mizrahi et al. | 385/37 |
| 5,708,738 | 1/1998 | Perez et al. | 385/37 |
| 5,745,615 | 4/1998 | Atkins et al. | 385/37 |
| 5,748,814 | 5/1998 | Painchaud et al. | 385/37 |
| 5,830,622 | 11/1998 | Canning et al. | 385/37 |

FOREIGN PATENT DOCUMENTS

| | | | |
|---|---|---|---|
| 0 793 123 A1 | 9/1997 | European Pat. Off. | |
| 0 836 102 A2 | 4/1998 | European Pat. Off. | |
| 0 840 146 A1 | 5/1998 | European Pat. Off. | |
| 0 843 186 A1 | 5/1998 | European Pat. Off. | |
| 0 855 605 A2 | 7/1998 | European Pat. Off. | |
| 2 316 760 | 3/1998 | United Kingdom | G02B 6/00 |
| WO 98/08120 | 2/1998 | WIPO | |

OTHER PUBLICATIONS

B. Malo et al., "Micro–Bragg Gratings in Photosensitive Fibre using Single Excimer Pulse Refractive Index Modification Techniques", in Electronics Letters, 2$^{nd}$ Sep. 1993, vol. 29, No. 18, pp. 1668–1669.

K. O. Hill et al., "Birefringent Photosensitivity in Monomode Optical Fibre: Application to External Writing of Rocking Filters", in Electronics Letters, 15$^{th}$ Aug. 1991, vol. 27, No. 17, pp. 1548–1550.

K. O. Hill et al., "Efficient Mode Conversion in Telecommunication Fibre Using Externally Written Gratings", in Electronics Letters, 2$^{nd}$ Aug. 1990, vol. 26, No. 16, pp. 1270–1271.

(List continued on next page.)

*Primary Examiner*—Hemang Sanghavi
*Attorney, Agent, or Firm*—Nestor F. Ho

[57] ABSTRACT

A method and an apparatus for writing arbitrary refractive index perturbations along an optical waveguide. The method includes the steps of providing a waveguide having a photosensitive region and providing a writing beam of actinic radiation having a nominal diameter D, the writing beam defining an optical axis. A waveguide is translated relative to the optical axis of the writing beam at a known velocity v(t). A modulator modulates the radiation intensity I(t) of the writing beam as a function of time t to deliver a fluence of radiation, $\Phi(x)$, directly to the waveguide, wherein $$\Phi_{(x)} = \int_{x/v}^{x+D/v} I_{(t)} \cdot dt$$

The refractive index change $\Delta n_{(x)}$ at a position x along the waveguide length is related to the fluence delivered to that position as, $\Delta n_{(x)} = C \cdot \Phi_{(x)}$, wherein C is a scaling factor that accounts for the photosensitivity of the waveguide.

24 Claims, 7 Drawing Sheets

OTHER PUBLICATIONS

L. A. Everall et al., "Flexible Fabrication of Long–Period In–Fiber Gratings", in CLEO '98, Friday Morning, CFE2, pp. 513–514.

E. M. Dianov et al., "Thermo–Induced Long–Period Fibre Gratings", in ECOC 97, Sep. 22–25, 1997, Conference Publication No. 448, © IEE, 1997, pp. 53–56.

Ashish M. Vengsarkar et al., "Long–Period Fiber Gratings as Band–Rejection Filters", Optical Fiber Communication, OFC '95, pp. PD4–1–PD4–5.

Ashish M. Vengsarkar et al., "Long–Period Fiber Gratings as Band–Rejection Filters", Journal of Lightwave Technology, vol. 14, No. 1, Jan. 1996, pp. 58–65.

Vikram Bhatia et al., "Long–Period Fiber Grating Sensors", in Optical Fiber Communication, OFC'96, Technical Digest, vol. 2, pp. 265–266.

A. M. Vengsarkar et al., "Long–Period Fiber–Grating--Based Gain Equalizers" Optics Letters, vol. 21, No. 5, Mar. 1, 1996, pp. 336–338.

D. D. Davis et al., "$CO_2$Laser–Induced Long–Period Fibre Gratings: Spectral Characteristics, Cladding Modes and Polarisation Independence", Electronics Letters, $9^{th}$ Jul. 1998, vol. 34, No. 14, pp. 1416–1417.

J. R. Qian and H. F. Chen, "Gain Flattening Fibre Filters Using Phase–Shifted Long Period Fibre Gratings", Electronics Letters, $28^{th}$ May 1998, vol. 34, No. 11, pp. 1132–1133.

L. Dong et al., "Long Period gratings Formed in Depressed Cladding Fibres", Electronics Letters, $23^{rd}$ Oct. 1997, vol. 33, No. 22, pp. 1897–1898.

V. Bhatia and A. M. Vengsarkar, "Optical Fiber Long–Period Grating Sensors", Optics Letters, May 1, 1996, vol. 21, No. 9.

METHOD FOR WRITING ARBITRARY INDEX PERTURBATIONS IN A WAVE-GUIDING STRUCTURE

RELATED U.S. APPLICATIONS

The present application is a continuation-in-part of related U.S. application Ser. No. 08/942,590, entitled Method For Fabrication Of In-Line Optical Waveguide Refractive Index Gratings Of Any Length filed on Oct. 2, 1997, which is hereby incorporated by reference.

BACKGROUND OF THE INVENTION

The present invention relates to a technique to write arbitrary refractive index changes in wave-guiding structures without the need for an aperture or a series of apertures. The technique provides unprecedented manufacturing flexibility in research or production environments. More specifically, the present invention may be used to fabricate a variety of waveguide devices that require index of refraction changes along the waveguide length, such as long-period gratings (LPGs) of any length and having any desired refractive index function profile.

Generally to produce photo-induced index perturbations, one shapes the intensity profile of an actinic laser beam by passing the beam through an aperture, series of apertures, or an amplitude mask and then illuminating a photosensitive waveguide with the resulting pattern of actinic radiation. The refractive index is altered in the photosensitive regions of the waveguide that are exposed to this actinic radiation. Periodic devices, such as LPGs, are typically fabricated by passing a laser beam through a periodic amplitude-mask or a series of apertures, but these techniques have several drawbacks. For example, the periodicity of a mask must be changed to fabricate gratings of differing periods, which usually requires that a separate mask be made for each grating period that is desired. In addition, external optics, such as spatial filters, are needed to shape the envelope of the periodic index perturbations which are written into the waveguide for grating apodization, and sub-grating "stitching" is needed to create gratings longer than the amplitude-mask. Typical amplitude masks are about ten centimeters in length. In addition, specialized masks are needed to chirp the refractive index profile, and refractive index modulation functions other than periodic square-waves are difficult to produce. Finally, masks may be damaged by continuous exposure to the high fluences delivered by typical excimer lasers.

Photosensitive waveguides may be exposed to an unmasked UV beam to change the average refractive index of an existing Bragg grating. However, this method merely shifts the wavelength of an existing perturbation pattern and does not allow for the writing of a series of index perturbations, such as those of a long period grating.

Long-period gratings are formed by producing a series of index of refraction perturbations along the length of a waveguide. LPGs are useful temperature and strain sensors. Since LPGs are wavelength-dependent loss elements, they are capable of fine-tuning the spectral characteristics of a device or subsystem to meet certain optical transmission requirements. For instance, inline LPGs may be used to flatten the gain profile of broadband optical amplifiers for wavelength division multiplexing (WDM) systems. In WDM applications, several channels are transmitted simultaneously within the ~1530- to ~1560-nm band of an erbium-doped fiber amplifier (EDFA). Each channel is amplified by the EDFA, but the non-uniform gain profile of the EDFA leads to uneven signal amplification between the different channels and hence different signal-to-noise ratios. An LPG device may be fabricated with a loss spectrum that matches the erbium gain spectrum and may be used in an EDFA system to reduce significantly the problem due to uneven signal amplification.

Transmission loss in an LPG can be tailored in various ways, such as by changing the LPGs length, strength, or profile of the refractive index perturbation. To correct the gain characteristics of EDFA systems with LPGs, the amplifier gain spectrum is typically decomposed into a sum of individual constant-period LPG spectral shapes. The appropriate number of filters is fabricated with their shapes and strengths tailored by varying fiber exposure parameters. These gratings are then concatenated to produce a composite transmission spectrum. An LPG-corrected EDFA has been fabricated with a flat gain spectrum over a 40-nm band.

LPGs are made by creating refractive-index perturbations along the fiber with a periodicity much greater than the wavelength of light; in most instances, these periods are on the order of hundreds of microns. The period of the LPG refractive index perturbation is chosen to couple light from a guided mode of a fiber into lossy forward-propagating cladding modes. Coupling from the guided to unguided modes is wavelength-dependent, so spectrally selective loss is obtained.

Researchers have developed point-by-point techniques for LPG fabrication where each index perturbation along the waveguide length is individually written. With these methods, the shape of each index perturbation written in the waveguide is controlled by placing an aperture against the waveguide and irradiating the waveguide through it with actinic radiation. The fiber (or, alternatively, the beam steering assembly) is translated past the writing beam with a precision motion stage, and a mechanical shutter is used to control the radiation dose that is delivered to the fiber in selected locations. This method may eliminate many of the problems encountered with the amplitude-mask fabrication technique, but currently is limited to producing square-wave refractive index profiles. In addition, complicated and exacting motion, variable aperture, and dose delivery control is needed to fabricate chirped and apodized LPGs, reducing the practicality of this technique.

Accordingly, a method is desired for easily and accurately writing index perturbation patterns of any length and having any desired refractive index profile into a waveguide without the use of apertures and/or masks.

SUMMARY OF THE INVENTION

The present invention relates to a method for changing the refractive index as desired along a length of an optical waveguide without the use of an aperture or amplitude mask. The method comprises the steps of providing a waveguide having a photosensitive region and providing a writing beam of actinic radiation having a nominal diameter D, the writing beam defining an optical axis. Using a precise translation mechanism, the waveguide is translated perpendicular and relative to the optical axis of the writing beam at a known velocity v. The translation of the waveguide relative to the writing beam may be controlled so that the velocity of the waveguide, v(t), for any given point in time t during waveguide irradiation is known.

In a preferred embodiment, the waveguide comprises an optical fiber having a photosensitive region. The fiber may be, for example, mounted on a rotating drum, a spool-to-spool system, moving staging or be translated past the writing beam using a system of pulleys. The rotational speed of a fiber spool or drum may be controlled using, for example, a phase-locked-loop controller circuit.

A light intensity modulator is provided and set to modulate the intensity I of the writing beam as a function of time t. The total dose of radiation, $\Phi$, delivered to any given waveguide location is controlled by varying the intensity of the writing beam and the velocity of the waveguide as that location is translated across the writing beam. The index perturbation written into the waveguide is related to this radiation dose as $\Delta n_{(x)} = C \cdot \Phi_{(x)}$, wherein C is a scaling factor that accounts for the photosensitivity of the waveguide. Expressed in an equation format, the modulated beam delivers a fluence of radiation, $\Phi(x)$, directly to the waveguide, wherein $$\Phi_{(x)} = \int_{x/v}^{x+D/v} I_{(t)} \cdot dt$$

The refractive index change $\Delta n_{(x)}$ at a position x along the waveguide length is related to the fluence delivered to that position as, $\Delta n_{(x)} = C \cdot \Phi_{(x)}$.

In variations of the described method, the modulator may modulate the intensity of the writing beam in a periodic manner as a function of time t at a frequency f to deliver a fluence of radiation to the waveguide, wherein:

$$\Phi(x) = I_0 \cdot \frac{D}{v} \cdot \sum_n A_n \cdot \mathrm{sinc}\left(n\pi \cdot \frac{f}{v} \cdot D\right) \cdot \cos\left[2\pi \cdot n \cdot \frac{f}{v} \cdot x + \frac{n\pi f}{v} \cdot D\right]$$

$I_0$ is the maximum intensity of the writing beam, $A_n$ are weighting components for the $n^{th}$ term in the Fourier series representation of the function $\Phi_{(x)}$, and $\mathrm{sinc}(z) = \sin(z)/z$. The peak intensity of the periodically-modulated writing beam, $I_0$, may be modulated along with I(t). Similarly, the writing beam intensity may be modulated to control independently each term, $A_n$, of the Fourier series representation of the function defining the fluence delivered to the waveguide.

Those skilled in the art will recognize that scaling factors may be accounted into the equation, such as to reflect geometrical factors, light absorption parameters, and/or intensity distribution variations. Furthermore, those skilled in the art will appreciate that by controlling v(t), I(t) and accordingly $I_0$ and $A_n$, any desired index profile function may be written on the waveguide. For example, a periodic index perturbation of period $\Lambda$ may be written into the waveguide, where $$\Delta n_{(x)} = C \cdot I_0 \cdot \frac{D}{v} \cdot \sum_n A_n \cdot \mathrm{sinc}\left(\frac{n\pi}{\Lambda} \cdot D\right) \cdot \cos\left[2 \cdot \frac{n\pi}{\Lambda} \cdot x + \frac{n\pi}{\Lambda} \cdot D\right].$$

In another example, the writing beam intensity I(t) may be modulated to produce an offset sinusoidal function expressible by a Fourier series as $$A_n = \begin{cases} 1, & n = 1, 2 \\ 0, & n > 2 \end{cases}$$

The fluence delivered to the waveguide then is expressible as $$\Phi(x) = I_0 \cdot \frac{D}{v} \cdot \left\{ 1 + \mathrm{sinc}\left(\pi \cdot \frac{f}{v} \cdot D\right) \cdot \cos\left[2\pi \cdot \frac{f}{v} \cdot x + \frac{\pi f}{v} \cdot D\right] \right\}$$

In yet another example, the writing beam intensity I(t) may be modulated to produce an offset periodic square wave expressible by a Fourier series as $$A_n = \begin{cases} 1, & n = 0 \\ (-1)^{\frac{n-1}{2}} \cdot \frac{4}{n \cdot \pi}, & n = 1, 3, 5, \ldots \end{cases}$$

With the method of the present invention, it is possible to write an index perturbation that results in a transmission loss spectrum through the waveguide that is matched to the erbium gain spectrum. Waveguide devices written in accordance with the present method, including LPGs, may be used in a variety of devices, such as optical amplifiers and strain, temperature and environmental sensors.

DETAILED DESCRIPTION OF THE INVENTION

The method of the present invention allows the use of an intensity-modulated laser beam to write, without apertures or amplitude masks, arbitrary patterns of index perturbations in a waveguide. More specifically, the method may be applied to fabricate inline long period gratings of any desired refractive index profile and length.

Figure 1:
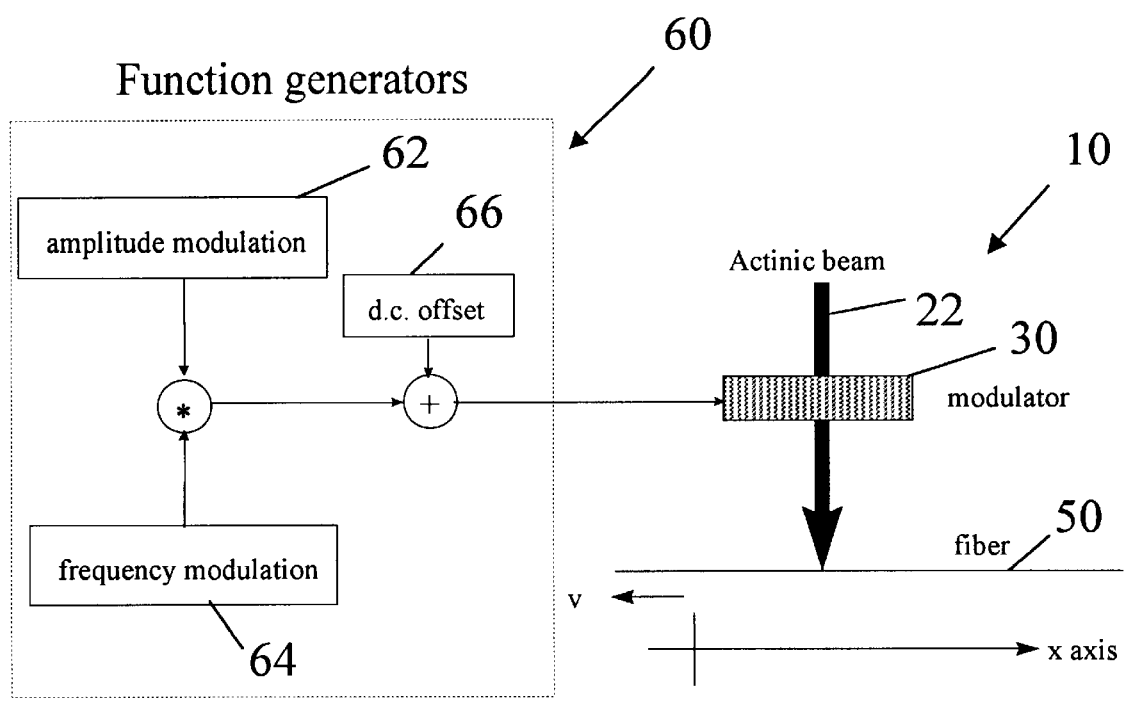
FIG. 1 is a block diagram of a configuration used to write refractive index perturbations in a waveguide without a mask in accordance with the present invention.
Figure 2:
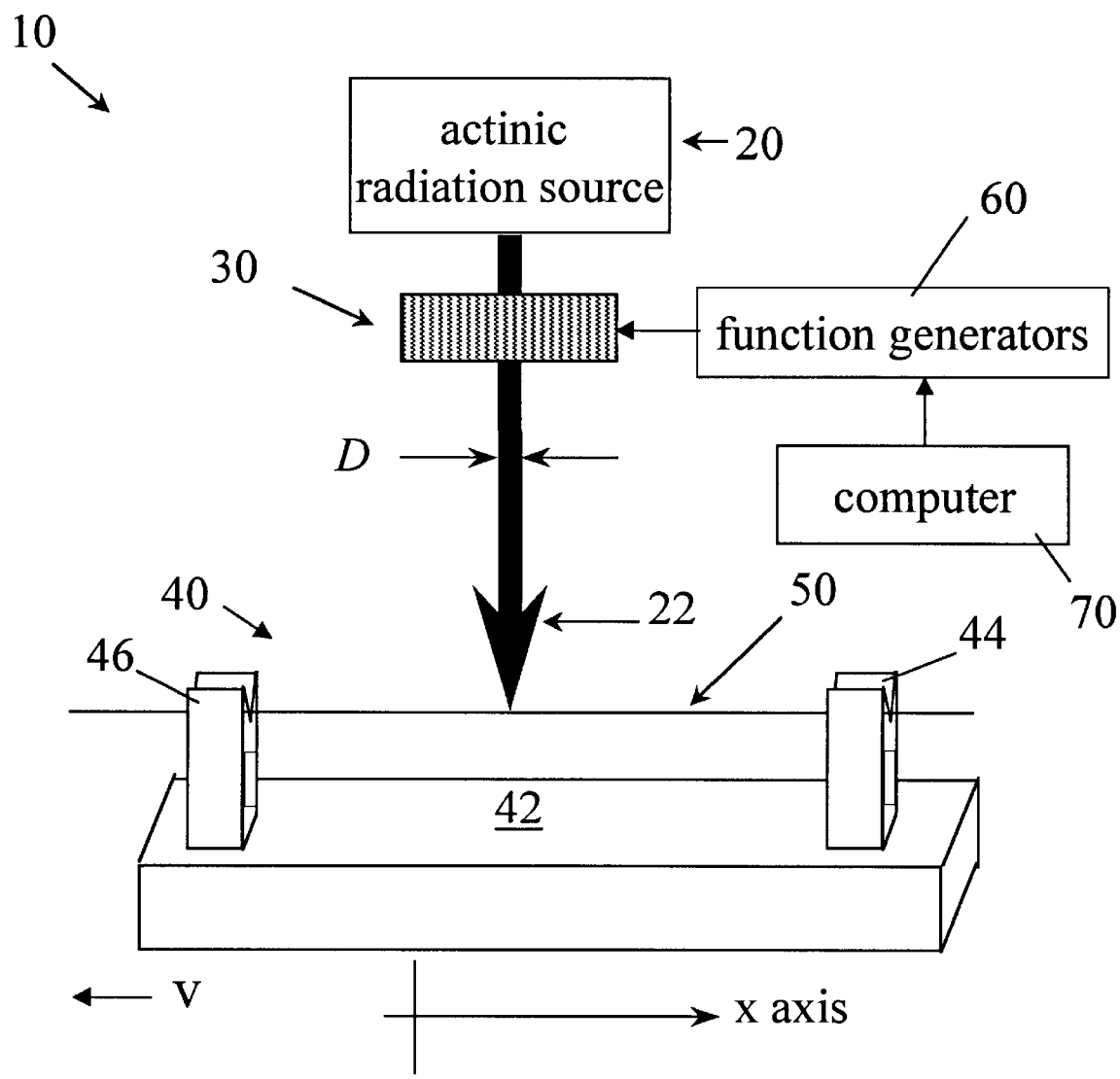
FIG. 2 is a simplified side view of an index-perturbation writing assembly in accordance with the present invention.

FIG. 1 schematically illustrates an index perturbation writing assembly 10 that can execute the method of the present invention. FIG. 2 is a simplified side view of a first embodiment of the writing assembly 10. The writing assembly 10 includes a source of actinic radiation 20 producing an actinic beam 22, a modulator 30, and a waveguide holding assembly and translation mechanism 40 used to hold and move a waveguide 50. In alternative embodiments, the writing assembly may simultaneously accommodate more than one waveguide.

In the present embodiment, the waveguide 50 is an optical glass fiber. The optical fiber may be made mainly from $SiO_2$ and doped with germanium, but in general, any photosensitive waveguide may be used. Germanium or other photosensitive dopants are added to the silica glass in a region of the fiber 50, making the refractive index of that region of the optical fiber susceptible to change, generally an increase, upon exposure to actinic radiation. The fibers may be loaded with hydrogen or deuterium to increase their photosensitive qualities. The photosensitivity factor of the region of the fiber may be expressible as C, which may be a function of the delivered radiation. Commercially available photosensitive fibers, such as Corning® SMF-28™ CPC6 (Corning Incorporated, Corning, N.Y.), may be used. As those skilled in the art may appreciate, the method of the present invention also may be used to modify the refractive index not only of optical fibers, but also of other waveguides, such as planar waveguides. Similarly, fibers having more than one photosensitive region having different or similar photosensitivity factors may be used.

The light source 20 is a source of actinic radiation, such as UV laser light or X-ray radiation. The source of light is selected to deliver a beam of sufficient intensity and having a sufficiently narrow diameter to write the desired grating. Other sources of light known in the art may be used depending on the composition of the waveguide and the desired grating pattern. The source of light 20 produces a beam 22 having a peak intensity of $I_0$ and a nominal diameter D. In the analysis presented here, the intensity profile of the writing beam is approximated as being square. Numerous and varied other beam configurations can be assumed by those skilled in the art without departing from the spirit and scope of this invention.

FIG. 1 illustrates schematically one embodiment of a function generator 60 that controls the modulator 30 to write periodic perturbations into a waveguide. The function generator 60 may include an amplitude modulation function 62, a frequency modulation function 64, and a controllable D.C. offset 66. The frequency modulation function 64 determines the periodicity and shape of the periodic waveform written into the waveguide, while the oscillation-envelope (amplitude modulation) function 62 varies slowly the amplitude of the oscillations to apodize grating characteristics, for example. A variety of amplitude light modulators 30 may be used, such as an opto-acoustic modulator (for example, IntraAction ASM-1251LA3 from IntraAction, Bellwood, Ill.). The modulator 30, modulates the intensity of the writing beam 22 at a frequency f(t) if a periodic structure is to be written into the waveguide. As illustrated in FIG. 1, function generators 60, such as Stanford Research Systems DSM345s (Stanford Research Systems, Sunnyvale, Calif.), may shape the electronic signal that controls the modulator. This shaping is to tailor the index perturbation profile written along the waveguide length to cause chirp and apodize the resulting grating. The function generator 60 may be coupled to and controlled by a central processor or computer 70 that monitors process variables and results.

The fiber 50 is translated at a velocity v(t) relative to the writing beam 22. Again, more than one waveguide may be translated simultaneously through the beam. When writing periodic or aperiodic perturbations, the fiber 50 is translated at a precisely known velocity v(t) past the modulated writing beam 22 that is intensity-modulated at a frequency f(t), so $$\frac{v(t)}{f(t)} \approx \Lambda,$$

where $\Lambda$ is the spatial period of the periodic index perturbation written into the waveguide. Depending on the writing assembly and the desired profile, both f(t) and v(t) may be variable functions, or either or both could be constants. Of course, the term constant is defined within the acceptable parameters for deviations in the fiber grating pitch due to jitter or error.

The movement of the fiber 50 in relation to the writing beam 22 is controlled precisely by the translation mechanism 40. FIG. 2 illustrates a first embodiment of a translation mechanism 40 including a very precise velocity-controlled motion stage 42, such as an Aerotech Model No. ABL20010-LN10 linear motor driven stage from Aerotech, Pittsburgh, Pa. or a precise rotary motion stage, such as Dover Instruments Model No. 635RF from Dover Instruments Corp., Westboro, Mass. The fiber 50 is held by two v-grooves or clamps 44 and 46. In a preferred embodiment, a motion stage with <0.1 µm/s precision is used. While translating a waveguide at a speed of ~1 mm/s, a ~2 KHz modulation with <0.2 Hz flutter is recommended to produce LPGs in the Erbium-doped fiber amplifier band. Currently available opto-acoustic modulators are capable of <1 µHz flutter, and commercially-available rotary stages controlled with a phase-lock-loop, such as an MCS LA 2000, from Motion Control Systems, Inc., Dublin, Va., are capable of <10 p.p.m. velocity flutter on a rim-speed of ~1 mm/s, which is more than sufficient to make high quality LPGs. Fibers with higher photosensitivities allow for increased waveguide translation velocities.

Figure 3:
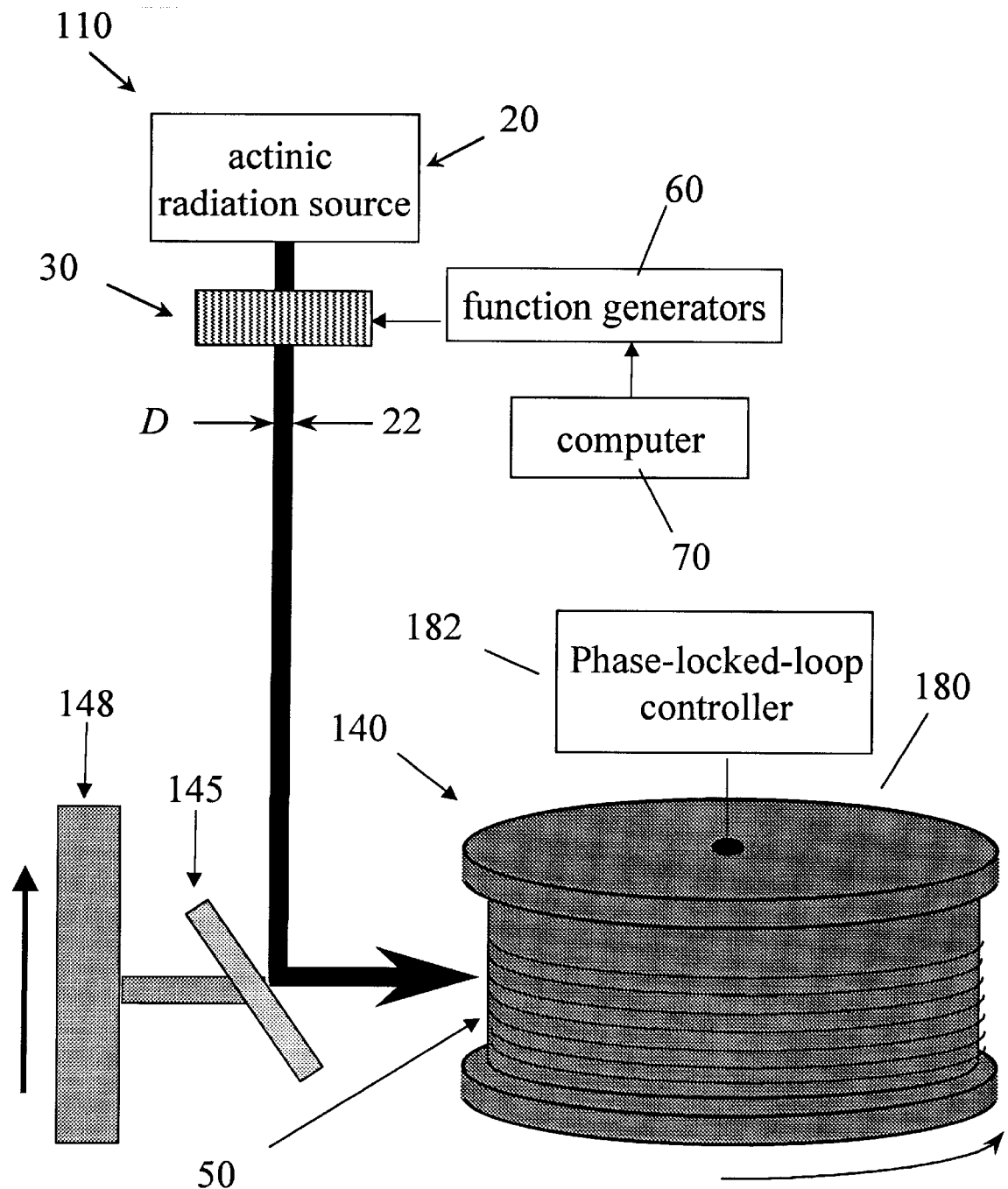
FIG. 3 is a schematic view of a second embodiment of an index-perturbation writing assembly in accordance with the present invention.

To manufacture a grating longer than the range of travel of precision motion stages, one may translate the fiber through the writing beam with, for example, a rotating drum or a web-drive system. FIG. 3 illustrates a second embodiment 110 of an index perturbation writing assembly having a translation mechanism 140 using a rotating spool or drum 180. All other elements are similar to those of the first embodiment 10 of FIG. 2 and are similarly labeled. The circumference of the drum 180 is known and the rotational speed of the drum 180 is controlled, such as by a precise phase-locked-loop controller 182. The position of the writing beam 22 may move during the writing process by moving a mirror 145 with a translational stage 148 to ensure that the beam tracks the fiber 50 as the spool 180 rotates.

Figure 4:
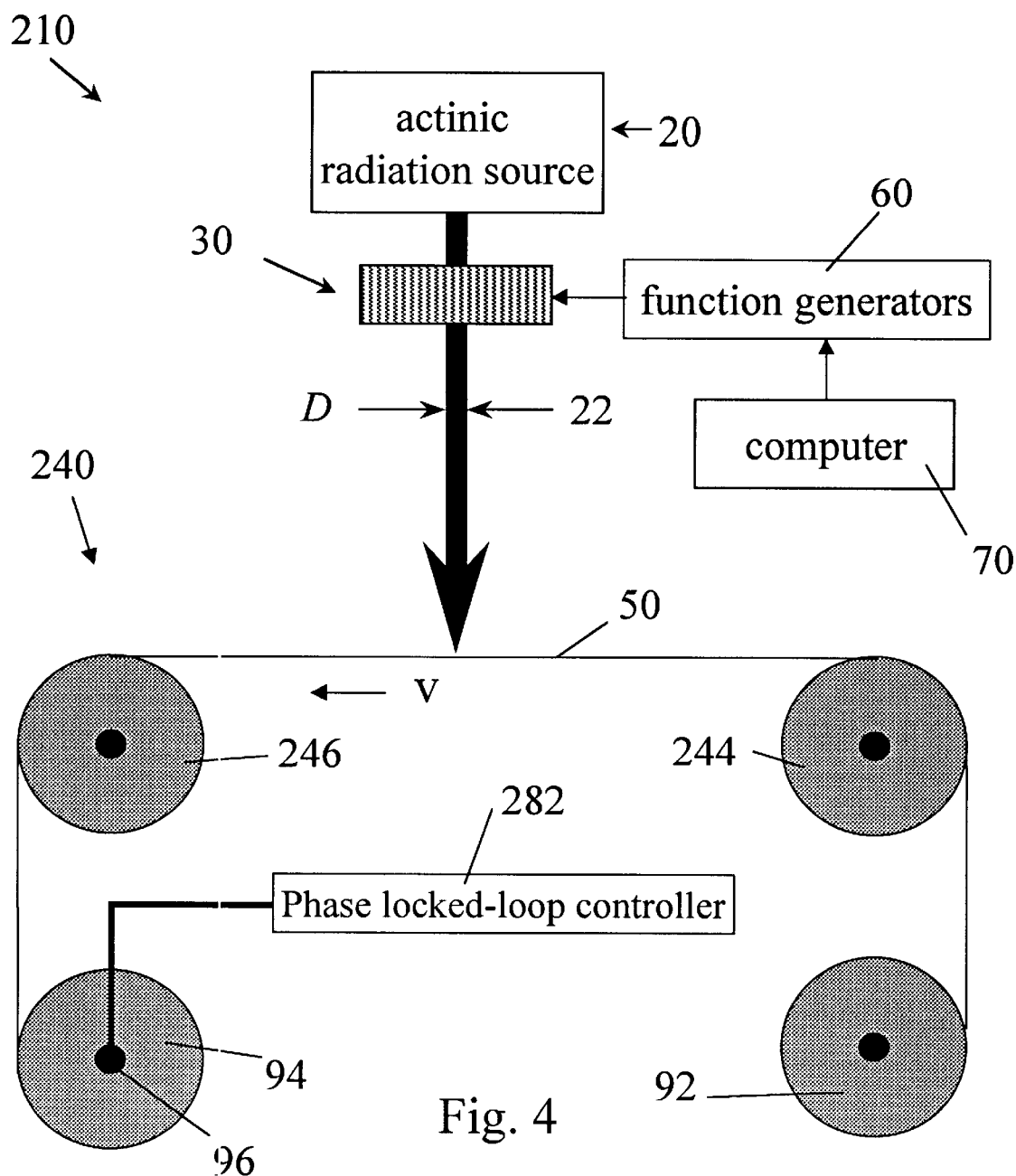
FIG. 4 is a schematic view of a third embodiment of an index-perturbation writing assembly in accordance with the present invention.

Since the method of the present invention requires velocity control, as opposed to precise positioning, the fiber alternatively may be fed by a web drive system, illustrated in FIG. 4, having dispensing and take-up spools 92 and 94, respectively. FIG. 4 illustrates a third embodiment 210 of an index perturbation writing assembly having a spool-to-spool translation mechanism 240 in which, the continuous length of fiber 50 is first provided in the dispensing or feed spool 92 and is pulled into the take-up spool 94. The rotational speed of these spools is achieved, for example, with a spindle motor 96 controlled by phase-locked-loop circuitry 282 to provide precise rim velocities. From the dispensing spool 92 the fiber 50 is positioned through the v-grooves of a first set and a second set of pulleys and/or tensioners 244 and 246 that align the fiber 50 in front of the writing beam 22, and into the take-up spool 94.

A significant advantage of the method of the present invention is that it does not require precise position monitoring and control. Accordingly, in one embodiment of the present invention, the speed of the fiber in relation to the writing beam is constant. In another embodiment, the movement of the stage, the spool, and/or of the fiber, is controlled and/or monitored and coupled to act in synchrony with the modulator. This method is particularly useful to allow the writing of an index perturbation on a fiber being dispensed by a device not having an extremely precise constant speed, such as a fiber draw tower. In yet other alternative embodiments, a translation mechanism may control the movement of the source of light and the fiber may or may not be fixed.

The fiber 50 may be placed into V-grooves, as illustrated in FIG. 2, or precision V-groove pulleys as illustrated in FIG. 4 to maintain precise alignment of the fiber with the writing beam 22. The fiber 50 is threaded or positioned in the translation mechanism 40. In an alternative embodiment of this invention, the fiber may be permanently affixed to the rotating spool 180, and a grating written directly in the fiber while the fiber remains wound on the spool. The spool with the grating on it may be packaged. This direct-spool writing method reduces, or even eliminates, operator fiber handling. This velocity-controlled method of fabricating index perturbations allows rotary stage and web-drive technologies to be utilized to create index perturbation in waveguides of arbitrary patterns and unlimited length without the need of amplitude masks or apertures.

The change in the refractive index along a length x of the waveguide can be expressed as $\Delta n(x)$. The translation mechanism 40 controls the translation of the waveguide relative to the writing beam so that the velocity of the waveguide, $v(t)$, for any given point in time t during waveguide irradiation is known. The modulator 30 controls the intensity $I(t)$ of the writing beam so the waveguide location x receives a total radiation dose $\Phi$ that is a function of the waveguide translation velocity and beam intensity. The fluence of radiation delivered to the waveguide along its length, $\Phi(x)$, is related to the index perturbation as $\Delta n_{(x)} = C \cdot \Phi_{(x)}$.

To create periodic index perturbations, the fiber is translated at a precisely controlled velocity $v(t)$ past a writing beam of actinic radiation that is intensity-modulated at frequency $f(t)$. With the direct digital synthesis function generator 60, one can fabricate arbitrary periodic functions that are sent to the light modulator 30 to create a writing beam intensity I as a function of time t expressible as a Fourier series by $$I_{(t)} = I_0 \cdot \sum_n A_n \cdot \cos(2\pi \cdot n \cdot f \cdot t) \tag{1}$$

where $I_0$ is the maximum intensity of the writing beam and $A_n$ are weighting components for the $n^{th}$ term in the Fourier series representation of the function. The fluence $\Phi$ delivered to a fiber along its length x by a laser beam of width D and peak intensity $I_0$ as it is translated across the beam is $$\Phi(x) = I_0 \cdot \int_{x/v}^{x+D/v} \sum_n A_n \cdot \cos(2\pi \cdot n \cdot f \cdot t) \cdot dt \tag{2}$$

which reduces to $$\Phi(x) = I_0 \cdot \frac{D}{v} \cdot \sum_n A_n \cdot \mathrm{sinc}\left(n\pi \cdot \frac{f}{v} \cdot D\right) \cdot \cos\left[2\pi \cdot n \cdot \frac{f}{v} \cdot x + \frac{n\pi f}{v} \cdot D\right] \tag{3}$$

Scaling factors may be accounted into the value of $I(t)$, and hence $\Phi$, or may be introduced into the equation, such as to reflect geometrical factors, light absorption parameters, and/or intensity distribution variations. Those skilled in the art will appreciate that by controlling $v(t)$, $I(t)$ and accordingly $I_0$ and $A_n$, any desired index profile function may be written in the waveguide.

Figure 6:
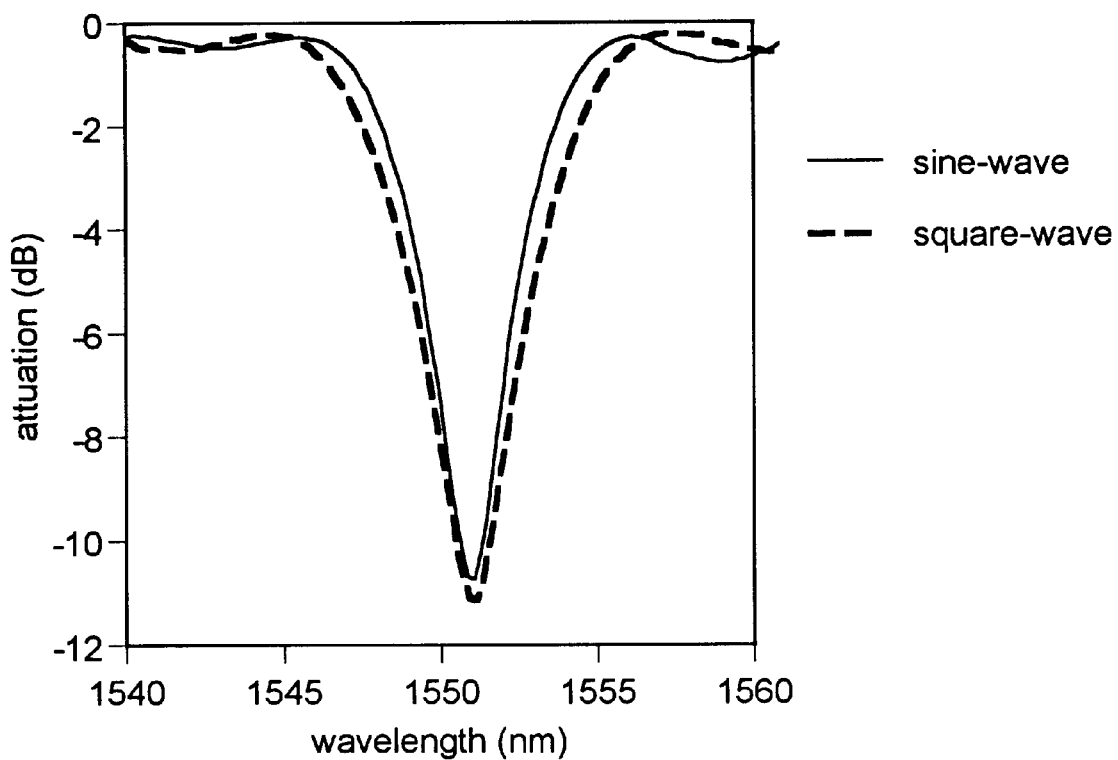
FIG. 6 is a graph of the attenuation vs. wavelength profile of a square-wave LPG compared to a sine-wave LPG.

One can manufacture a periodic index perturbation of any period $\Lambda$ greater than the diameter of the beam, where $\Lambda = v/f$, by changing the modulation frequency of the light intensity or the velocity of the fiber relative to the writing beam. For LPG fabrication, the function generator controls the intensity of the actinic radiation beam to create periodic refractive index perturbations that couple light from the forward-propagating $LP_{01}$ confined mode to cladding modes. The coupling efficiency between these modes as a function of wavelength is characterized by several factors, such as the periodicity and shape of the index perturbation and the fiber structure. FIG. 6 compares transmission spectra through LPGs for differing shapes of the index perturbation. By changing the perturbation periodicity, one may fabricate LPGs with different center wavelengths. Generally LPGs are considered to be fiber gratings with an index perturbation periodicity that is at least 10 times larger than the wavelength of input light. Typical an LPG period is between 15 to 1500 $\mu$m to create maximum coupling efficiencies between 700 to 1500 nm. Chirps in the refractive index modulation can be written into the fiber by continuously tuning the frequency of modulation. As one skilled in the art may appreciate, different types of fiber mode couplers, other than LPGs, can be fabricated with the method detailed herein without departing from the spirit and scope of the invention.

The width of the laser beam causes the index profile written into the fiber to be low-pass spatially filtered, as indicated by the sinc-function weighing term in the Fourier-series representation of the delivered fluence given in Equation (3). Qualitatively Equation (3) may be viewed as the beam profile (a square profile in this case) convolved with the intensity functional form I with the time variable expressed in spatial coordinates, i.e. I(x/v). This picture is useful for evaluating the spatial filtering caused by other beam profiles, such as Gaussians. If D<0.1 $\Lambda$, then this spatial filtering will be negligible for the first several components of the decomposition. Since LPGs typically have periods of hundreds of micrometers, the writing beam diameter can be focused easily to write intricate index profiles along the grating length.

The method described above may also be used to make apodized periodic mode couplers, such as LPGs. The amplitude envelope of the writing beam modulation can be controlled via another function generator 62 or suitable electronics as the fiber is translated across the laser beam. By defining $\phi(t)$ to represent the Fourier series representation of the intensity I without an offset, i.e.

$$\varphi_{(t)} = \sum_n A_n \cdot \cos(2\pi \cdot n \cdot f \cdot t)$$

with $n \geq 1$, one can represent mathematically pure-apodization as (compare with Equation 1)

$$I_{(t)} = I_0 \cdot \{1 - M_{(t)} \cdot \phi_{(t)}\} \tag{4}$$

where the amplitude envelope, M(t), can vary between ±1. Regardless of the level of envelope modulation, the average flux delivered to the fiber is constant and, hence, pure-apodization is achieved. The physical configuration used to achieve this control is detailed in FIG. 1. Chirped LPGs with pure apodization can be manufactured in a one-step writing process, without special phase masks, apertures, or attenuation optics.

It will become readily apparent to those skilled in the art that in addition to simplifying current LPG manufacturing methods, this fabrication technique allows different index perturbation functions to be written into a fiber, something that was difficult with other reported methods. As will be shown, this additional ability provides one with another manufacturing control to shape the optical characteristics of mode coupling. For example, a sinusoidal index perturbation can be written into a fiber with a standard function generator. In this case, $$A_n = \begin{cases} 1, & n = 1, 2 \\ 0, & n > 2 \end{cases} \quad (5)$$

which gives a delivered radiation dose of $$\Phi(x) = I_0 \cdot \frac{D}{v} \cdot \left\{ 1 + \mathrm{sinc}\left(\pi \cdot \frac{f}{v} \cdot D\right) \cdot \cos\left[2\pi \cdot \frac{f}{v} \cdot x + \frac{\pi f}{v} \cdot D\right] \right\} \quad (6)$$

Figure 5A:
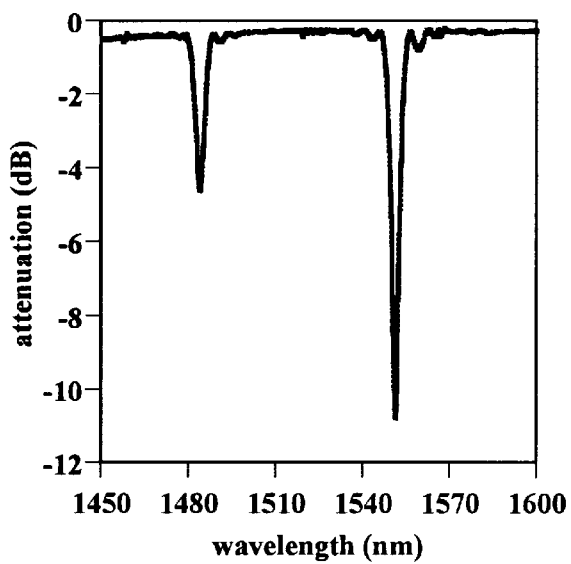
FIG. 5A is a graph of the attenuation vs. wavelength profile of an LPG made with sine-wave pattern in accordance with the present invention.
Figure 5B:
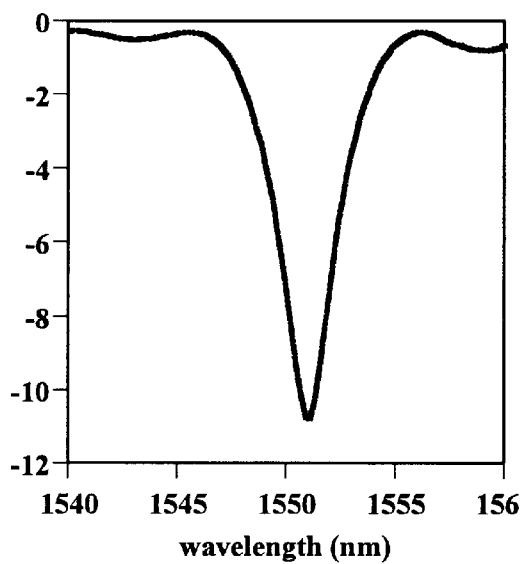
FIG. 5B is an expanded view of a portion of the graph illustrated in FIG. 5A.

An example of this type of grating is shown in FIGS. 5A and 5B, where a 2.222-Hz-modulated ~100-$\mu$m-diameter 150-mW 244-nm-wavelength laser beam was used to write an LPG into a fiber translating at 1 mm/s past the beam. This grating required 68 seconds to fabricate (LPG length=68 mm).

A square-wave perturbation can be also written into a fiber with a standard function generator. In this case, $$A_n = \begin{cases} 1, & n = 0 \\ (-1)^{\frac{n-1}{2}} \cdot \frac{4}{n \cdot \pi}, & n = 1, 3, 5, \dots \end{cases} \quad (7)$$

An example transmission spectrum from this type of grating is shown in FIG. 6, which was written with the same experimental parameters as the previous sine-wave generated spectrum shown in FIG. 5. FIG. 6 also compares the square-wave generated transmission spectrum to a sine-wave generated LPG spectrum written with the same experimental parameters. The peak of the coupling efficiency of the square-wave LPG spectrum is shifted by ~4 nm to longer wavelengths in the figure to compare it with the sine-wave generated spectrum. This grating required 54 seconds to fabricate (LPG length=54 mm). The 440-$\mu$m-period of the square-wave generated grating is on the order of the writing beam diameter, so only a few terms in the Fourier-series decomposition for the square-wave are written effectively into the fiber. (The beam size could easily be reduced with conventional optics.) Nevertheless, these sine- and square-wave LPGs have different attenuation characteristics, showing that functional shape of the index perturbation is another parameter that can be changed to match specific attenuation requirements.

Figure 7:
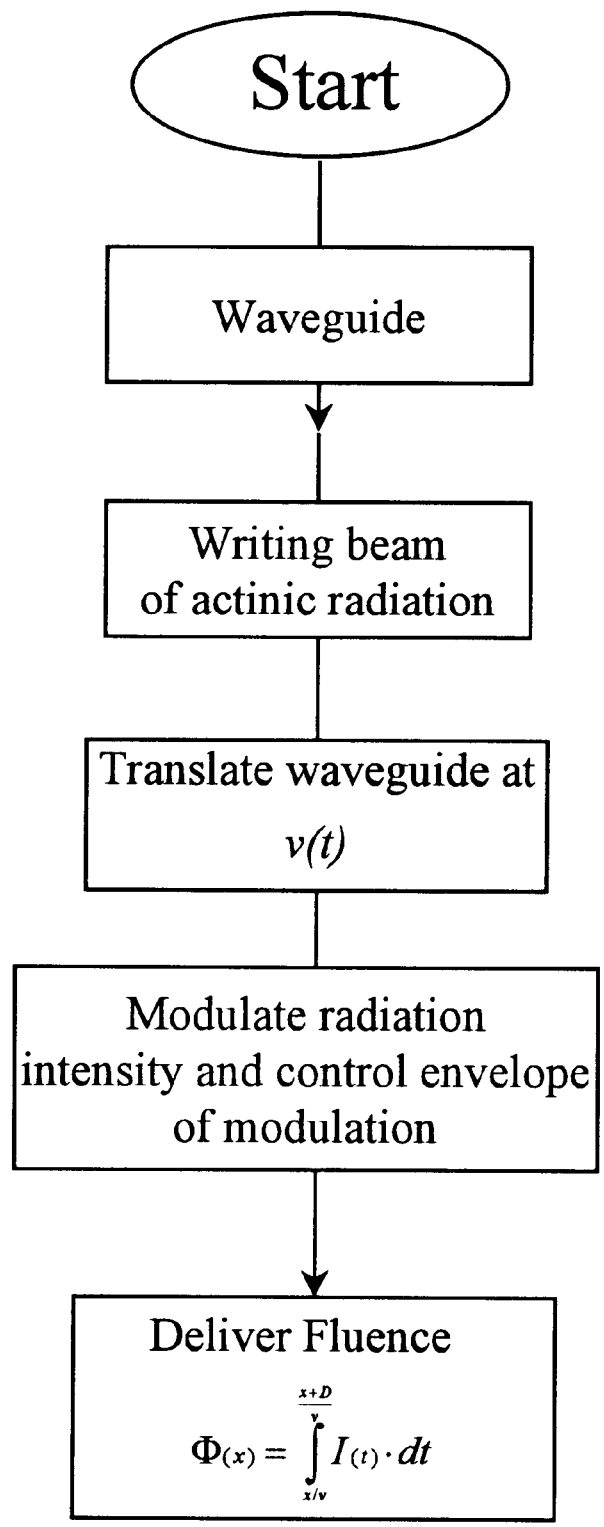
FIG. 7 is a flowchart detailing the steps of the method of the present invention.

FIG. 7 is a flowchart summarizing the steps of the method of the present invention. In the first step a waveguide having a photosensitive region is provided. A writing beam of actinic radiation having a diameter D and an intensity I(t) also is provided. The waveguide is translated past the beam at a relative velocity v(t). The radiation intensity of the beam is modulated and the envelope of modulation is controlled such that the fluence of radiation delivered to the fiber varies spatially across the waveguide length as $$\Phi_{(x)} = \int_{x/v}^{x+D/v} I_{(t)} \cdot dt.$$

The method of the present invention offers the ability to write in-line optical waveguide long-period gratings of virtually any length with any desired refractive index profile. The availability of long LPGs (longer than one meter) allows the novel use of gratings in a variety of applications.

The methods and embodiments described and illustrated herein are illustrative only, and are not to be considered as limitations upon the scope of the present invention. Those skilled in the art will recognize that other variations and modifications may be made in accordance with the spirit and scope of the present invention.

What is claimed is:

1. A method for writing arbitrary refractive index perturbations along an optical waveguide, the method comprising the steps of:

providing a waveguide having a photosensitive region;

providing a writing beam of actinic radiation having a nominal diameter D, the writing beam defining an optical axis;

translating the waveguide relative to the optical axis of the writing beam at a known velocity v(t);

modulating the radiation intensity I(t) of the writing beam as a function of time t;

delivering a fluence of radiation, $\Phi(x)$, directly to the waveguide, wherein $$\Phi_{(x)} = \int_{x/v}^{x+D/v} I_{(t)} \cdot dt$$

wherein the refractive index change $\Delta n_{(x)}$ at a position x along the waveguide length is related to the fluence delivered to that position as, $\Delta n_{(x)} = C \cdot \Phi_{(x)}$, wherein C is a scaling factor that accounts for the photosensitivity of the waveguide.

2. The method of claim 1, further comprising the step of modulating the intensity of the writing beam in a periodic manner as a function of time t at a frequency f(t) to deliver a fluence of radiation to the waveguide, wherein:

$$\Phi(x) = I_0 \cdot \frac{D}{v} \cdot \sum_n A_n \cdot \mathrm{sinc}\left(n\pi \cdot \frac{f}{v} \cdot D\right) \cdot \cos\left[2\pi \cdot n \cdot \frac{f}{v} \cdot x + \frac{n\pi f}{v} \cdot D\right]$$

where $I_0$ is the maximum intensity and $A_n$, are weighting components for the $n^{th}$ term in the Fourier series representation of the function $\Phi_{(x)}$.

3. The method of claim 1, further comprising the step of writing a periodic index perturbation of period $\Lambda$ into the waveguide, where $$\Delta n_{(x)} = C \cdot I_0 \cdot \frac{D}{v} \cdot \sum_n A_n \cdot \mathrm{sinc}\left(\frac{n\pi}{\Lambda} \cdot D\right) \cdot \cos\left[2 \cdot \frac{n\pi}{\Lambda} \cdot x + \frac{n\pi}{\Lambda} \cdot D\right].$$

4. The method of claim 2, further comprising the step of modulating the peak intensity $I_0$ of the periodically-modulated writing beam.

5. The method of claim 2, further comprising the step of modulating the writing beam intensity to control independently each term, $A_n$, of the Fourier series representation of the function defining the fluence delivered to the waveguide.

6. The method of claim 1, wherein the waveguide is an optical fiber having a photosensitive region.

7. The method of claim 1, wherein I(t) is an offset sinusoidal function expressible by a Fourier series as $$A_n = \begin{cases} 1, n = 1, 2 \\ 0, n > 2 \end{cases},$$

wherein the fluence delivered to the waveguide is expressible as $$\Phi(x) = I_0 \cdot \frac{D}{v} \cdot \left\{1 + \cdot \mathrm{sinc}\left(\pi \cdot \frac{f}{v} \cdot D\right) \cdot \cos\left[2\pi \cdot \frac{f}{v} \cdot x + \frac{\pi f}{v} \cdot D\right]\right\}.$$

8. The method of claim 1, wherein I(t) is an offset periodic square wave expressible by a Fourier series as $$A_n = \begin{cases} 1, n = 0 \\ (-1)^{\frac{n-1}{2}} \cdot \frac{4}{n \cdot \pi}, n = 1, 3, 5, \ldots \end{cases}$$

9. The method of claim 1, wherein the index perturbation creates a transmission loss spectrum through the waveguide that is matched to the inverted erbium gain spectrum.

10. An optical amplifier including a waveguide having an index perturbation manufactured in accordance with the method of claim 1.

11. A method for manufacturing a waveguide having a refractive index perturbation, wherein the change in the refractive index along a length x of the waveguide can be expressed as Δn(x), the method comprising the steps of:

providing a waveguide having a photosensitive region and a photosensitivity factor expressible as C;

providing a writing beam of actinic radiation with a nominal diameter D;

controlling the translation of the waveguide relative to the writing beam so that the velocity of the waveguide, v(t), for any given point in time t during waveguide irradiation is known;

controlling the radiation intensity I(t) of the writing beam so the waveguide location x receives a total radiation dose Φ, wherein the fluence of radiation delivered to the waveguide along its length, Φ(x), is related to the index perturbation as $\Delta n_{(x)} = C \cdot \Phi_{(x)}$.

12. The method of claim 11, wherein $$\Phi_{(x)} = \int_{x/v}^{\frac{x+D}{v}} I_{(t)} \cdot dt.$$

13. The method of claim 11, further comprising the step of modulating the radiation intensity in a periodic manner as a function of time t at a frequency f to deliver a fluence to the waveguide, wherein:

$$\Phi(x) = I_0 \cdot \frac{D}{v} \cdot \sum_n A_n \cdot \mathrm{sinc}\left(n\pi \cdot \frac{f}{v} \cdot D\right) \cdot \cos\left[2\pi \cdot n \cdot \frac{f}{v} \cdot x + \frac{n\pi f}{v} \cdot D\right],$$

where $I_0$ is the maximum intensity and $A_n$ are weighting components for the $n^{th}$ term in the Fourier series representation of the function $\Phi_{(x)}$.

14. The method of claim 11, further comprising the step of writing a periodic index perturbation of period Λ into the waveguide, where $$\Delta n_{(x)} = C \cdot I_0 \cdot \frac{D}{v} \cdot \sum_n A_n \cdot \mathrm{sinc}\left(\frac{n\pi}{\Lambda} \cdot D\right) \cdot \cos\left[2 \cdot \frac{n\pi}{\Lambda} \cdot x + \frac{n\pi}{\Lambda} \cdot D\right].$$

15. The method of claim 13, further comprising the step of modulating the peak intensity $I_0$ of the periodically-modulated writing beam.

16. The method of claim 13, further comprising the step of modulating the writing beam intensity to control independently each term, $A_n$, of the Fourier series representation of the function defining the fluence delivered to the waveguide.

17. The method of claim 11, wherein the waveguide is an optical fiber having a photosensitive region.

18. The method of claim 11, wherein I(t) is an offset sinusoidal function expressible by a Fourier series as $$A_n = \begin{cases} 1, n = 1, 2 \\ 0, n > 2 \end{cases},$$

wherein the fluence delivered to the waveguide is expressible as $$\Phi(x) = I_0 \cdot \frac{D}{v} \cdot \left\{1 + \cdot \mathrm{sinc}\left(\pi \cdot \frac{f}{v} \cdot D\right) \cdot \cos\left[2\pi \cdot \frac{f}{v} \cdot x + \frac{\pi f}{v} \cdot D\right]\right\}.$$

19. The method of claim 11, wherein I(t) is an offset periodic square wave expressible by a Fourier series as $$A_n = \begin{cases} 1, n = 0 \\ (-1)^{\frac{n-1}{2}} \cdot \frac{4}{n \cdot \pi}, n = 1, 3, 5, \ldots \end{cases}$$

20. The method of claim 11, wherein the index perturbation creates a transmission loss spectrum through the waveguide that is matched to the inverted erbium gain spectrum.

21. An optical amplifier including a waveguide having an index perturbation manufactured in accordance with claim 11.

22. A long-period grating writing assembly for writing long-period gratings on a photosensitive waveguide, the assembly comprising:

a source of light producing a writing beam of actinic radition having a peak intensity of $I_0$ and a nominal diameter D;

a light modulator placed along the path of the writing beam of actinic radiation that controls the intensity I(t) of the writing beam, the modulator including electronic signal controls, the electronic signal controls having an amplitude modulation function, a frequency modulation function and a d.c. offset;

a fiber holding assembly and translation mechanism that supports the waveguide, aligns the waveguide to intersect the path of the writing beam and translates the waveguide at a relative velocity v(t) with respect to the writing beam.

23. The long-period writing assembly of claim 22, the fiber holding assembly including a dispensing spool, a velocity-controlled take-up spool, and a phase lock-loop circuit that controls the rotational velocity of the take-up spool, wherein the rotational velocity of the take-up spool is coupled to act in synchrony with the light modulator.

24. The assembly of claim 22, wherein the modulator modulates the radiation intensity of the writing beam in a periodic manner as a function of time t at a frequency f to deliver a fluence to the waveguide, wherein:

$$\Phi(x) = I_0 \cdot \frac{D}{v} \cdot \sum_n A_n \cdot \mathrm{sinc}\left(n\pi \cdot \frac{f}{v} \cdot D\right) \cdot \cos\left[2\pi \cdot n \cdot \frac{f}{v} \cdot x + \frac{n\pi f}{v} \cdot D\right],$$

* * * * *